US 6,910,019 B2
Jun. 21, 2005

(12) United States Patent
Dorr

(54) COUNTDOWN ON-LINE AUCTION CLOCK

(76) Inventor: Robert C. Dorr, 6101 Muddy Creek Rd., Pueblo, CO (US) 81004

( * ) Notice: Subject to any disclaimer, the term of this patent is extended or adjusted under 35 U.S.C. 154(b) by 602 days.

(21) Appl. No.: 09/759,105

(22) Filed: Jan. 11, 2001

(65) Prior Publication Data

US 2002/0016743 A1 Feb. 7, 2002

Related U.S. Application Data

(60) Provisional application No. 60/178,189, filed on Jan. 26, 2000.

(51) Int. Cl.$^7$ .............................................. G06F 17/60
(52) U.S. Cl. ........................................ 705/37; 705/27
(58) Field of Search ................................ 345/318, 338, 345/769, 800; 705/26, 27, 37; 719/318; 706/10; 709/219; 375/376

(56) References Cited

U.S. PATENT DOCUMENTS

| 5,465,277 | A | * | 11/1995 | Schreurs et al. ............. 375/376 |
| 5,995,951 | A | * | 11/1999 | Ferguson ..................... 706/10 |
| 6,058,417 | A | * | 5/2000 | Hess et al. ................... 709/219 |
| 6,141,008 | A | * | 10/2000 | Bloomfield ................... 345/800 |
| 6,198,696 | B1 | * | 3/2001 | Korpi et al. ................... 368/21 |
| 6,412,021 | B1 | * | 6/2002 | Nguyen et al. ............. 719/318 |
| 6,415,270 | B1 | * | 7/2002 | Rackson ....................... 705/37 |
| 6,456,307 | B1 | * | 9/2002 | Bates et al. .................. 345/838 |
| 6,529,217 | B1 | * | 3/2003 | Maguire, III et al. ........ 345/769 |

FOREIGN PATENT DOCUMENTS

NL  9201152 A  *  1/1994

OTHER PUBLICATIONS envsoftware.com web site captured via the WayBackMachine and dated Nov. 27, 1999.*

AuctionTamer screen prints captured via the WayBackMachine (archieve.org) dated Nov. 27, 1999.*

* cited by examiner

*Primary Examiner*—Wynn W. Coggins
*Assistant Examiner*—R. E. Rhode, Jr.
(74) *Attorney, Agent, or Firm*—Dorr, Carson, Sloan, Birney & Kramer, P.C.

(57) ABSTRACT

A method is disclosed herein for displaying time lapse for an on-line auction for an item in a computer. According to the method, the processor time in the computer is obtained and compared to the official auction time for the items being auctioned in the on-line auction which is obtained from the on-line auction service. The users computer compares the obtained processor time to the obtained official auction time and correlates the end of time from the on-line auction service to a processor end of time which corresponds to the user's time. The computer then displays the time left correlated to the processor's time preferably in a visual countdown graphical icon.

9 Claims, 7 Drawing Sheets

|  #  | Item               | Price | Bids | Ends     |
|-----|--------------------|-------|------|----------|
| 34  | Stereoview         | 6.50  | 2    | 2 mins.  |
| 85  | Hook's Viewbook    | 28.00 | 1    | 5 mins.  |
| -   | -                  | -     | -    | -        |
| -   | -                  | -     | -    | -        |
| -   | -                  | -     | -    | -        |
| 99  | Postcard           | 5.00  | 0    | 55 mins. |

Figure 1
Prior Art

Current Date and Time

| Pacific Time | Mountain Time | Central Time | Eastern Time |
|---|---|---|---|
| 8:06:17 | 9:06:17 | 10:06:17 | 11:06:17 |

COUNTDOWN ON-LINE AUCTION CLOCK

RELATED APPLICATIONS

This application claims the benefit under 35 U.S.C. §119 (e) of U.S. Provisional Application Ser. No. 60/178,189 filed on Jan. 26, 2000 entitled COUNDOWN ON-LINE AUCTION CLOCK.

BACKGROUND OF THE INVENTION

1. Field of the Invention

The present invention relates to on-line auctioning and, particularly, to accurately determine the end of the on-line auction for an item.

2. Statement of the Problem

It is common for on-line auction services to provide an end time that is typically set by the seller of an item to the auction. In eBay, Inc., for example, when a particular item is searched based upon key word, the SEARCH RESULTS web page 100 as shown in FIG. 1 shows the item by number 110, by description 120, the current bid price 130, the number of bids 140, and when the auction ends 150. For example, as an item approaches the end of its deadline, the end time 150 is set forth in minutes. In eBay, Inc., the SEARCH RESULTS 100 show the time in minutes when sixty or less minutes exist. This end time 150, in the case of eBay, Inc., is based upon an official time 160 which is a separate screen display 200, shown in FIG. 2, that shows the eBay, Inc. current date and time for the various time zones 210. A user has to click on 160 to see FIG. 2.

On the screen 300, shown in FIG. 3, for the auction of the item 310, the start time 320 for the auction is set forth and the end time 330 for the auction for that item is set forth as well as the TIME LEFT 340.

Unfortunately, the official time 210 does not usually correspond to the time on the user's computer. Hence, a need exists to derive a time left or a countdown time independent of the official time of the auction service.

SUMMARY OF THE INVENTION

The present invention provides a unique and novel countdown time independent of the auction service and based upon the user's own computer time.

A method is disclosed herein for displaying the time left for an on-line auction for an item in a computer. According to the method, the processor time in the computer is obtained and compared to the official auction time for the items being auctioned in the on-line auction which is obtained from the on-line auction service. The user's computer compares the obtained processor time to the obtained official auction time and correlates the end of time from the on-line auction service to a processor end of time which corresponds to the user's time. The computer then displays the time left correlated to the processor's time preferably in a visual countdown graphical icon.

BRIEF DESCRIPTION OF THE DRAWINGS

FIG. 1 is a prior art SEARCH RESULTS screen, from an on-line auction service

FIG. 2 is a prior art screen showing the official time of the on-line auction service.

DETAILED DESCRIPTION OF THE INVENTION

Figure 3:
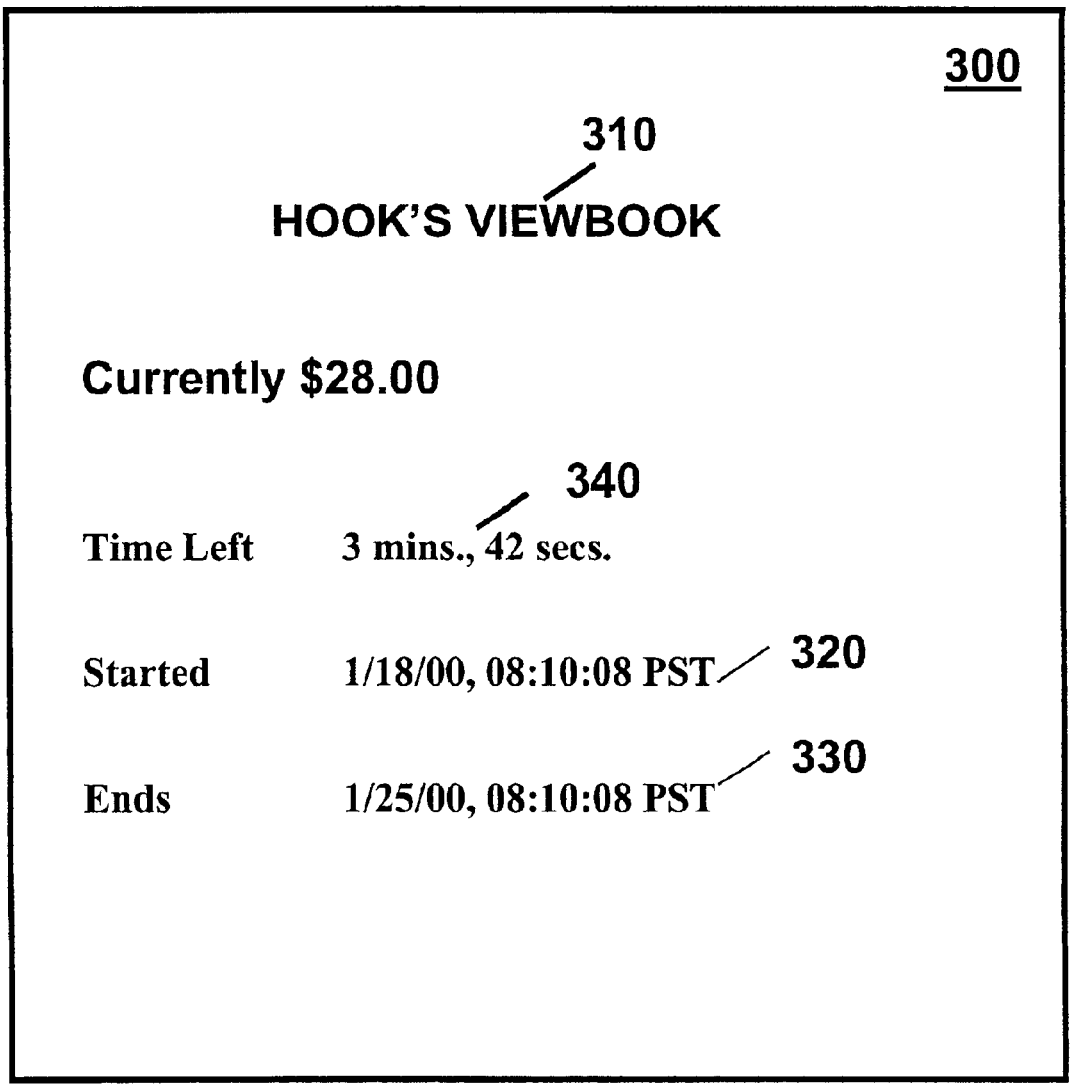
FIG. 3 is the prior art screen showing the web page for an item being auctioned on a conventional on-line service.
Figure 4:
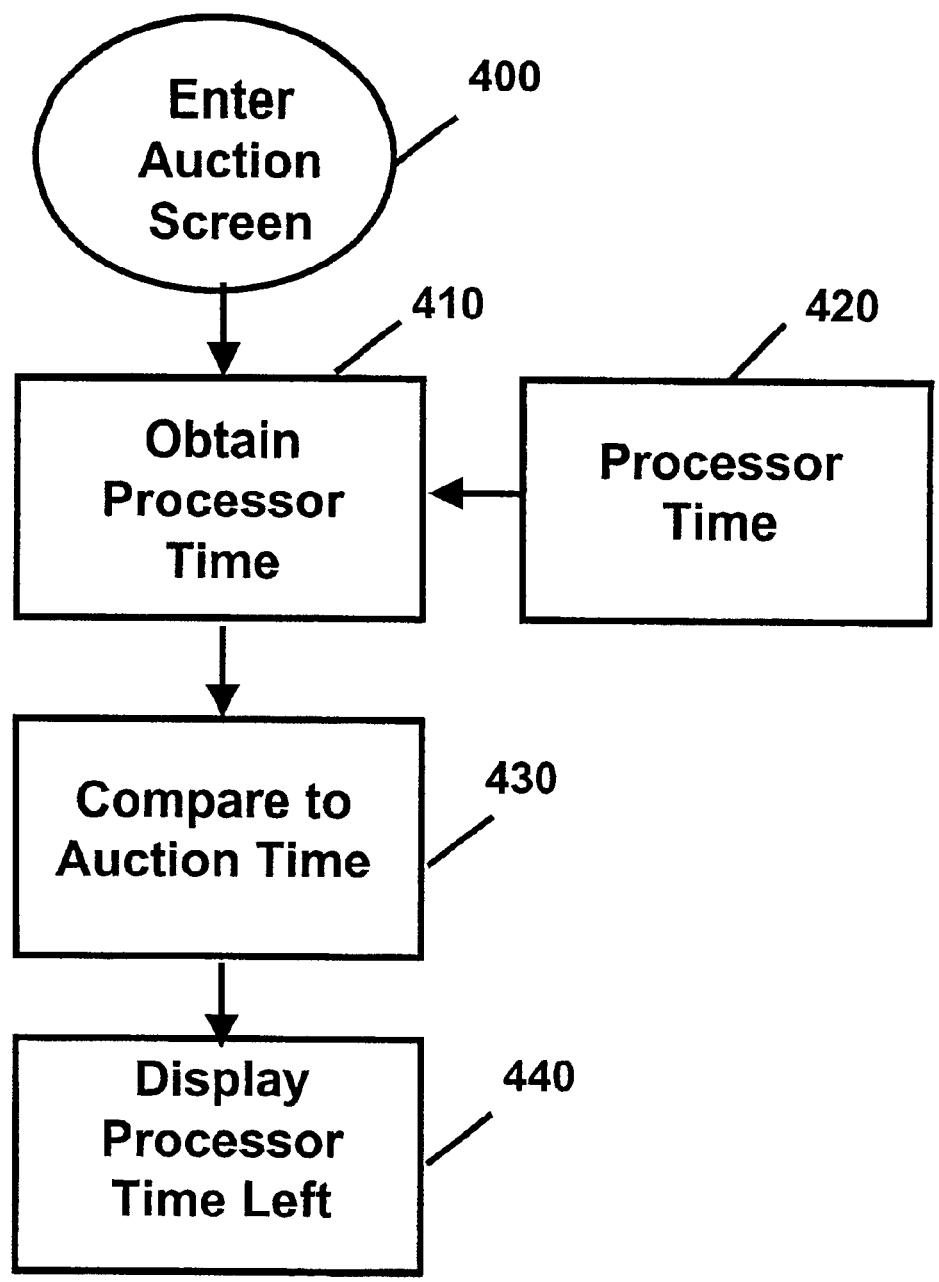
FIG. 4 is a flow chart implementing the method of one embodiment of the present invention.

The present invention provides a unique countdown or time left indicator that ties the on-line auction service official time to the time of the user's computer. As shown in FIG. 4, the present invention enters stage 400 which is the conventional stage of entering the screen 300 for an item being auctioned as shown in FIG. 3. In stage 410 of the present invention, as soon as the screen 300 is displayed on a user's computer, the method obtains the processor time from an internal memory field 420 in the user's processor, not shown. In stage 430 the obtained processor time is compared to the time left 340 for the auction. The time left based upon the processor time (hereinafter referred to as Count Down time) is now displayed in stage 440.

Figure 5:
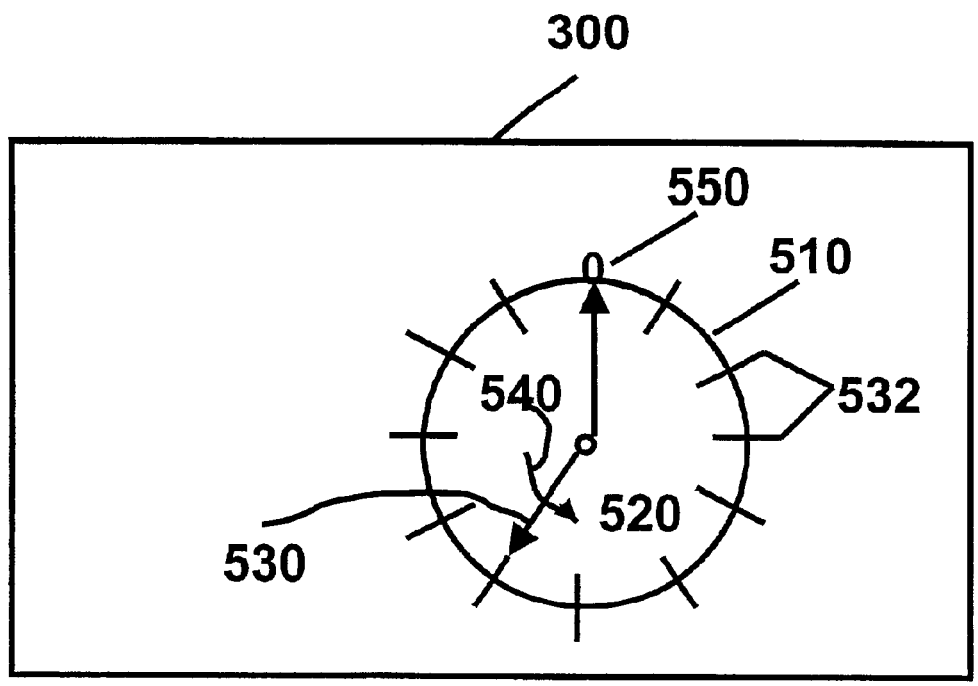
FIG. 5 illustrates a countdown icon of the present invention.
Figure 6:
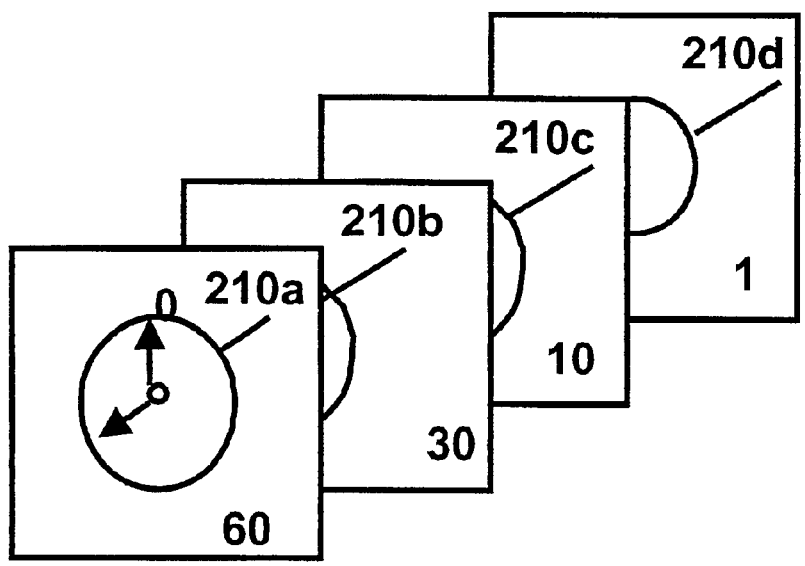
FIG. 6 shows alternate embodiments of the icon of FIG. 5.
Figure 7:
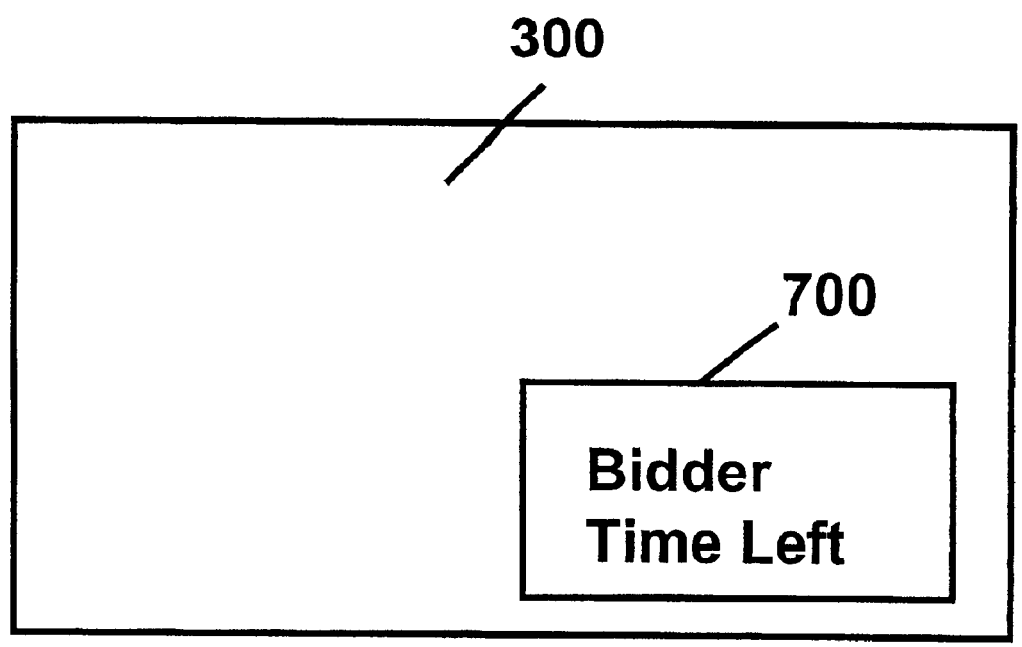
FIG. 7 shows a bidder time left icon of the present invention.

This provides the Count Down time based upon a user's computer for the time left 340. This eliminates any misunderstanding by a prospective bidder or an actual bidder. In FIG. 5, the auction screen 300 is shown with the addition of a special graphic icon 510 that shows, in the preferred embodiment, a clock face 520 with a indicator 530 moving in the direction of arrow 540 to the end of the auction 550. Any suitable markings 532 such as minutes, seconds, or combinations thereof can be utilized. Furthermore, as shown in FIG. 6, different graphical icons such as 510a, 510b, 510c, 510d can be utilized at the time countdown towards zero 550. For example, with 60 minutes left the icon 510a can be utilized to provide the full 60 minutes. There can be a 30-minute icon 510b, a ten-minute icon 510c, and a one-minute icon 510d. The graphical icon 510 itself can be any suitable graphic representation with or without accompanying audio effects.

The present invention makes it readily apparent to the user without any mental calculations whatsoever as to how much time is left based upon the processor time of the user.

In summary, for this to operate effectively, in stage 110, the processor time is obtained either simultaneously upon entering the auction screen 300 in stage 100 or shortly thereafter. For example, the auction service can issue a tone which can be detected to accurately correlate time. In an alternate embodiment, a separate icon 700 can be displayed on screen 200 and it then becomes the option of the prospective bidder to provide a countdown based upon his or her processor internal time. When stage 110 is entered and icon 400 is clicked on by the prospective bidder then at that time the compare between the processor time 120 and the official auction time 160 occurs in stage 130. Again, icon 400 can be any suitable icon or graphical image or combination of graphical image and audio sound. The count down time 440 is then displayed showing the auction's time left 150 correlated to the user's computer time.

It is to be expressly understood that the date/time properties of an individual's computer for the above discussed embodiment, the software FIG. 4 can either be offered as an integrated additional feature of the on-line service or it is possible to add on software service for an individual user's computer. The first approach is preferred.

In yet another embodiment of the present invention, in stage 430 if the user's processor time 420 is different from the official time of the auction on-line service, the method of the present invention in stage 430 would set the time of the user's computer to the official time so as to place the user's computer in sync with the official time of the on-line auction service.

Figure 8:
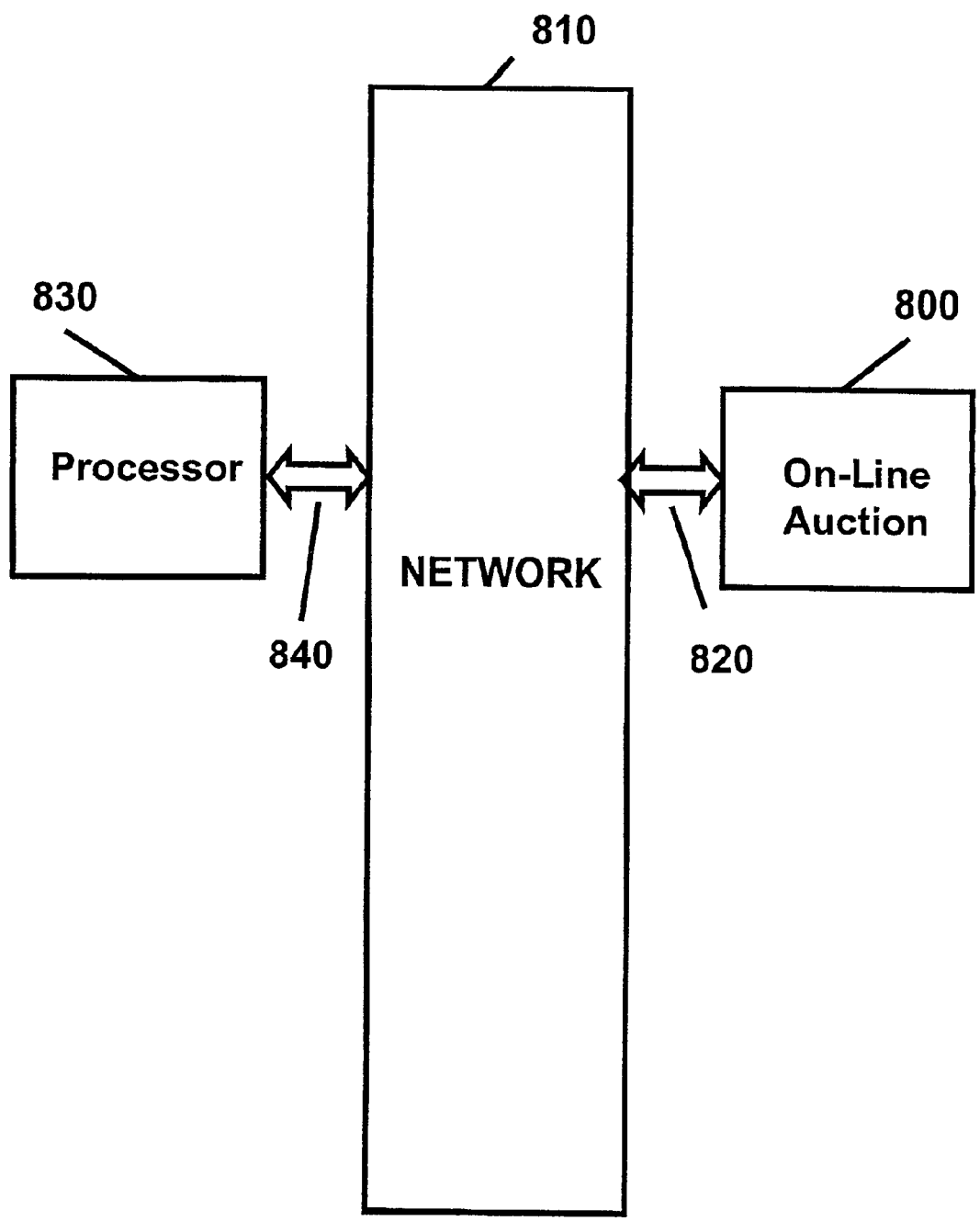
FIG. 8 sets forth the system environment showing the operation of the present invention.

In FIG. 8, the operating environment of the present invention in relation to the on-line auction service is shown. The on-line auction service 800 is conventionally interconnected with a communication network 810 over the communication link 820. Likewise, a bidder's processor 830 is interconnected over a communication link 840 to the network. It is to be expressly understood that the communication network 810, the communication links 820 and 840 can be any of a number of conventional approaches and that one skilled in the art can readily set up an Internet business for communication to a stand-alone processor 830 at an individual's home or office.

In summary, a method is disclosed herein for displaying time lapse for an on-line auction for an item in a computer. According to the method, the processor time in the computer is obtained and compared to the official auction time for the items being auctioned in the on-line auction which is obtained from the on-line auction service. It is immaterial which time is obtained first. The user's computer compares the obtained processor time to the obtained official auction time and correlates the end of time for an item being auctioned in the on-line auction service to a processor end of time which corresponds to the user's time. The computer then displays the time left for the item correlated to the processor's time preferably in a visual countdown graphical icon.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

I claim:

1. A method for displaying time left for an on-line auction of an item conducted by an on-line auction service in a computer of a bidder, said method comprising the steps of:

obtaining the processor time in the computer of the bidder, obtaining the official auction time for said on-line auction in the computer of the bidder from said on-line auction service, obtaining the auction time left for said item in the computer of the bidder from said on-line auction service, comparing in the computer of the bidder the obtained processor time to the obtained official auction time, displaying in the computer of the bidder a time left in processor time for said item in response to the comparing step and said obtained auction time left.

2. The method of claim 1 wherein the step of displaying includes the step of visually counting down the time left in processor time in at least one graphical icon.

3. The method of claim 2 wherein the graphical icon is a clock face having an indicator moving in a direction towards zero wherein zero corresponds to the end of said on-line auction.

4. The method of claim 2 wherein the step of displaying includes providing a plurality of graphical icons, each of said plurality of graphical icon corresponding to a predetermined time period.

5. The method of claim 4 wherein said plurality of graphical icon includes a first graphical icon corresponding to a predetermined time period of 60 minutes.

6. The method of claim 4 wherein said plurality of graphical icon includes a first graphical icon corresponding to a predetermined time period of 30 minutes.

7. The method of claim 4 wherein said plurality of graphical icon includes a first graphical icon corresponding to a predetermined time period of 10 minutes.

8. The method of claim 4 wherein said plurality of graphical icon includes a first graphical icon corresponding to a predetermined time period of 60 seconds.

9. The method of claim 1 further including the steps of: providing an icon during said on-line auction, clicking on the icon to activate the displaying of the time left.

* * * * *